Aug. 31, 1965

H. UHRMEISTER ETAL 3,203,313

HOBBING MACHINE

Filed Aug. 28, 1962

INVENTORS
H. Uhrmeister
F. Becher
By
Watson, Cole, Grindle & Watson
Attorneys

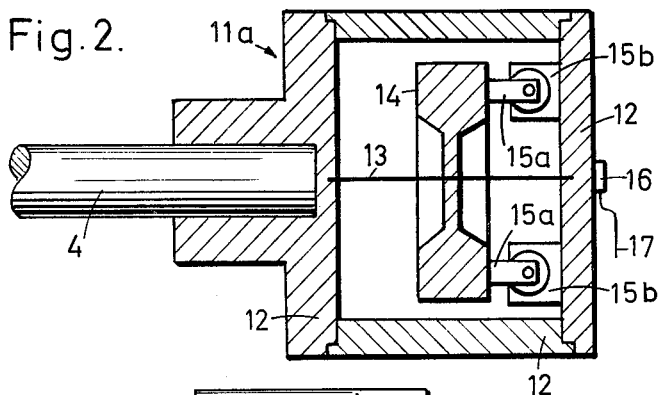
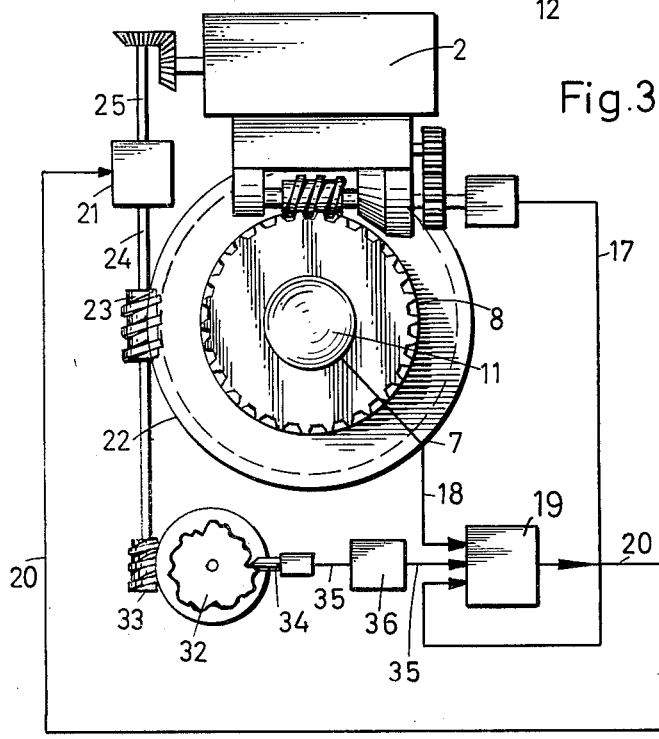

United States Patent Office 3,203,313
Patented Aug. 31, 1965

3,203,313
HOBBING MACHINE
Hans Uhrmeister, Asperg, and Friedrich Becher, Ludwigsburg, Germany, assignors to Firm Hermann Pfauter, Ludwigsburg, Germany, an unlimited-liability company of Germany
Filed Aug. 28, 1962, Ser. No. 219,979
Claims priority, application Germany, Sept. 1, 1961, P 27,809
6 Claims. (Cl. 90—4)

This invention relates to hobbing machines for cutting toothed wheels and the like, including other workpieces having profiles which can be cut on hobbing machines, and having a cutter shaft carrying the hob and a rotary worktable for carrying a workpiece, which are driven at appropriately related speeds. The invention is concerned with means for reducing indexing errors, which arise in the operation of such machines owing to inaccuracies in the working parts of the machine, and has for its object to control the cutting process in such a way as to afford automatic compensation for such errors and thereby to achieve a high degree of accuracy in the grooving of the workpiece, notwithstanding such inaccuracies.

The means for reducing indexing errors according to the present invention comprises two flywheel masses, spring means through which such masses are coupled respectively to the cutter shaft and to the worktable, two measuring devices for measuring the relative angular rotation respectively between the cutter shaft and the flywheel mass coupled thereto and between the worktable and the flywheel mass coupled thereto, means for comparing the outputs of the two measuring devices with the interposition of a transmission device having a transmission ratio equal to that between the rotational speeds of the cutter shaft and of the worktable and for generating a signal in accordance with such comparison, and at least one adjustment device which is controlled by such signal and acts to modify the drive to the cutter shaft or the drive to the worktable, and thereby to maintain a substantially constant ratio between the angular rotations of the cutter shaft and of the worktable.

Means are preferably provided for compensating the addition indexing errors of an index gear wheel incorporated in the drive of the worktable. For this purpose, a storage device, which may be in the form of a shaped template, may be provided in which such addition indexing errors are recorded, means being provided for sensing such stored record and transmitting a signal in accordance therewith, such signal being combined with the signal derived from the two measuring devices in a mixing device whose output is transmitted to the adjusting device for the control thereof. The stored record preferably takes account only of the fundamental and lower order harmonic frequency components of the errors and means may be provided for damping out the higher order harmonic frequency components in the signal transmitted from the storage device.

The signals transmitted for the operation of the adjusting divice are preferably electrical signals, and in such case the circuit through which such signals are transmitted may include an electrical network having a frequency response, which is the inverse or approximately the inverse of that of the oscillating system constituted by either of the flywheel masses and its associated spring means.

Some practical arrangements according to the invention will now be described by way of example with reference to the accompanying drawings, in which—

FIGURE 2 illustrates one of the flywheel masses with the associated measuring devices, and FIGURES 3 and 4 are diagrammatic plan views of the machine showing two alternative control arrangements for the adjusting device.

Figure 1:
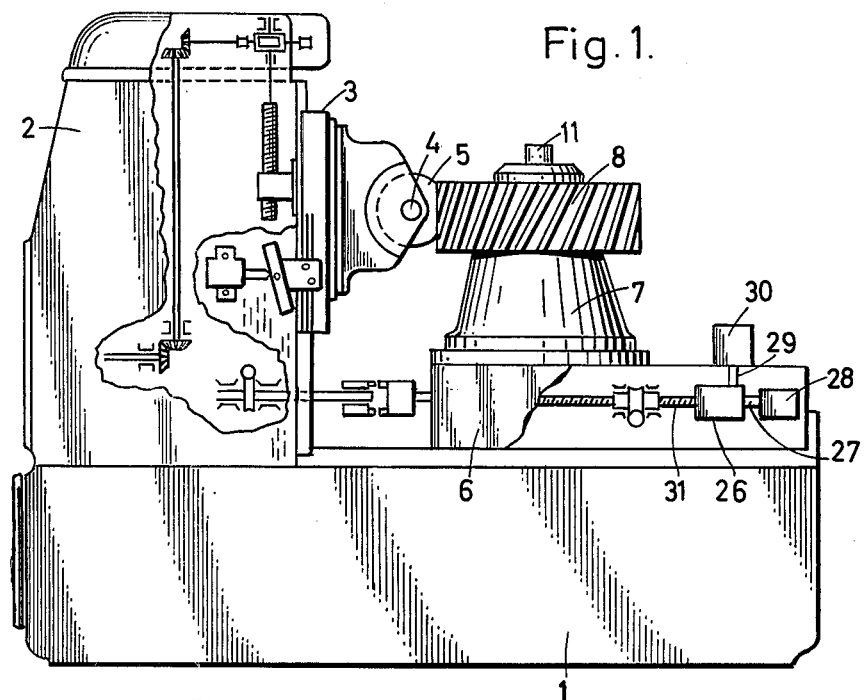
FIGURE 1 shows a general view of the hobbing machine in side elevation.

The hobbing machine shown in FIGURE 1 has a base 1 supporting a column 2, on which a cutting slide 3 is vertically displaceable. Journalled in the cutting slide 3 is a cutter shaft 4, on which a hob 5 is secured. The base 1 also supports a horizontally adjustable slide 6 carrying a rotary worktable 7, on which a workpiece 8, for example a toothed wheel to be cut, is mounted. FIGURE 1 shows the hob 5 in a position in which the workpiece 8 has been cut to approximately half its width.

A compensating apparatus 11 is mounted on the worktable 7 and a similar apparatus 11a, shown in detal in FIGURE 2, is mounted on the cutter shaft 4. This apparatus comprises a casing 12 rigidly connected to the cutter shaft 4 (or the worktable 7), in which is secured coaxially with the cutter shaft (or worktable) a spring rod 13 carrying a flywheel mass 14. The flywheel mass 14 thus participates in the rotation of the cutter shaft (or worktable) through the spring rod 13. Owing to inaccuracies in the driving members, the rotation of the cutter shaft and the rotation of the worktable are not strictly uniform. In comparison with an exactly uniform rotation, in which the angle of rotation is exactly proportional to time, fluctuations occur in the angle of rotation owing to these inaccuracies. The flywheel mass 14, however, cannot follow these fluctuations owing to its inertia and to the flexibility of the spring rod 13 and will rotate uniformly with the average speed of the casing 12; therefore, differences arise between the angles of the flywheel mass 14 and of the casing 12. These differences, indicating the angle of deflection of the shaft 4 from the exact position occupied when turning fully uniformly, are continuously measured by measuring, the relative movements of members 15a and 15b respectively carried by the flywheel mass 14 and by the casing 12, and electrical signals corresponding to such differences are transmitted through a slip ring head 16 and through an output conductor 17. Similar signals corresponding to the rotational fluctuations of the worktable 7 are transmitted through the conductor 18.

The conductors 17 and 18 lead to a mixing device 19, wherein the two sets of signals are compared with one another, a transmission device having a ratio corresponding to the ratio between the speeds of the cutter shaft 4 and the worktable 7 being incorporated in the mixing device to permit a true comparison between the two sets of signals. In this way, an output signal, dependent on any fluctuations from true proportionality between the speeds of rotation of the cutter shaft 4 and the worktable 7, is generated and is transmitted through the output conductor 20.

Figure 4:
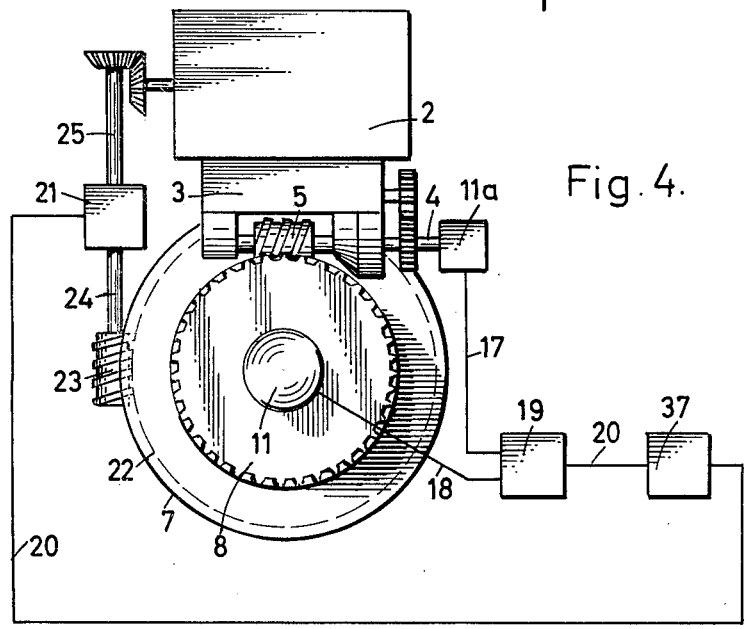

The conductor 20 leads to a regulating device 21 which, in the examples illustrated in FIGURES 3 and 4, is inserted in the drive to the rotary worktable 7, this drive being taken from a prime mover housed in the column 2 through suitable gearing to a shaft 25 and thence through the regulating device to a worm shaft 24 carrying a worm 23 which meshes with a worm wheel 22 carried by the worktable 7. The regulating device 21 acts to modify the drive transmitted to the worktable 7 in accordance with the signals received through the conductor 20, and thereby to correct the indexing errors as far as possible and to maintain a substantially constant ratio between the angular rotations of the cutter shaft 4 and of the worktable 7.

It will be clear that a regulating device similar to the device 21 could be inserted in the drive to the cutter shaft 4, either instead of or in addition to the device 21 in the drive to the worktable 7.

Whilst usually it will be convenient to employ electrical signals for the control of the regulating device, it will be clear that the necessary signal transmission could be effected mechanically or hydraulically or pneumatically or magnetically or in other ways.

The regulating device 21 may consist, for example, of a differential gear 26, and one such arrangement is diagrammatically indicated in FIGURE 1, wherein however by way of variant the drive for the worktable is derived from a constant speed motor 28 housed in the slide 6. In this arrangement, the motor 28 is connected through a shaft 27 to the driving wheel of the differential gear 26, whose planet wheel cage is driven through a shaft 29 from a D.C. motor 30, whose revolution speed is controlled by the varying voltage of the signals transmitted through the conductor 20. In this way the driven shaft 31 of the differential gear can be instantaneously and sensitively controlled. The regulating device can, however, be arranged in other ways, and may take the form of a magnetic coupling or a magnetically controlled friction coupling, whose slip can be regulated by controlling the magnetic field.

In the construction shown in FIGURE 3, the addition indexing errors of an index gear wheel in the drive to the rotary table 7, for example the worm wheel 22, are dealt with by recording these errors in a storage device 32, for example a shaped template. The addition indexing errors include the difference between the credit measure and the debit measure of a chosen number of successive pitch line or pitch circle graduations from a chosen starting point (DIN 3960). The template 32 is driven synchronously with the worm wheel 22, for example through another worm 33 on the shaft 24. This template is sensed, for example mechanically by the stylus 34, or electrically, and a signal dependent upon the error fluctuations stored in the template 32 is also fed through a conductor 35 to the mixing device 19. This provides an additional control through the output lead 20 of the mixing device, for the drive of the cutter shaft or of the rotary worktable. In this way account can be taken of the fact that the fundamental frequency component and the lower order harmonic frequency components of the errors, are not in all circumstances, especially when the rotational speed of the worktable is slow, adequately taken care of by the flywheel masses 14 which can follow such components to a certain degree. With low speeds of rotation therefore the record stored in the template needs only to contain those lower order components which are not adequately dealt with by the flywheel masses.

With higher rotational speeds of the worktable 7, an electrical frequency discriminating filter 36 may be provided in the conductor 35 from the storage device 32, which damps out the higher order harmonic components in the signal, since these are already dealt with adequately by the flywheel masses.

In the construction of FIGURE 4, an electric active or passive network 37 is provided in the output lead 20 of the mixing device (omitting the storage device 32 of FIGURE 3). This network has a frequency response which is the inverse or approximately the inverse of that of the oscillating system constituted by the flywheel mass 14 and its spring rod 13. In this way, the different effects of oscillation components of different order on such oscillation system are compensated. Such a network may also be inserted in the conductor 18 and if desired in the conductor 17 in addition.

The regulating device 21 need not form part of the drive to the rotary worktable 7 or the cutter shaft 4, and may instead effect its modification of the drive by effecting longitudinal adjustment of the cutter shaft 4 or of the worm 23 in the drive to the worktable.

What we claim as our invention and desire to secure by Letters Patent is:

1. A hobbing machine for cutting toothed wheels and the like, having a cutter shaft carrying the hob and a rotary table for carrying a workpiece and means for driving the cutter shaft and the worktable at appropriate speeds, and including means for reducing indexing defects in the operation of the machine, such means comprising two flywheel masses, spring means through which such masses are respectively coupled to the cutter shaft and to the worktable, a first measuring device for measuring the relative angular rotation between the cutter shaft and the flywheel mass coupled thereto, a second measuring device for measuring the relative angular rotation between the worktable and the flywheel mass coupled thereto, a transmission device having a transmission ratio corresponding to that between the speeds of drive of the cutter shaft and the worktable, means for comparing the outputs of the two measuring devices through such transmission device, means for generating a signal in accordance with such comparison, a regulating device associated with at least one of the two drives respectively to the cutter shaft and to the worktable and controlled by such signal, and means whereby the regulating device acts to modify the drive with which it is associated and thereby to maintain a substantially constant ratio between the angular rotations of the cutter shaft and of the worktable.

2. A hobbing machine as claimed in claim 1, including in combination an index gear wheel incorporated in the drive of the worktable, a storage device in which the addition indexing errors of the index gear wheel are recorded, means for sensing the record recorded in the storage device and for transmitting a signal in accordance therewith, a mixing device for receiving such signal and the signal derived from the two measuring devices and means for transmitting the resultant output of the mixing device to the regulating device for the control thereof.

3. A hobbing machine as claimed in claim 2, including, between the storage device and the mixing device, a frequency discriminating filter for damping out any higher order harmonic frequency components in the signal transmitted from the storage device.

4. A hobbing machine as claimed in claim 2, in which the signals transmitted to the mixing device are electrical signals, and including in the output circuit of the mixing device an electrical network having a frequency response which is at least approximately the inverse of that of the oscillating system constituted by either flywheel mass and its associated spring means.

5. A hobbing machine for cutting toothed wheels and the like, having a cutter shaft carrying the hob and a rotary table for carrying a workpiece and means for driving the cutter shaft and the worktable at appropriate speeds, and including means for reducing indexing errors in the operation of the machine, such means comprising two flywheel masses, spring means through which such masses are respectively coupled to the cutter shaft and to the worktable, a first measuring device for measuring the relative angular rotation between the cutter shaft and the flywheel mass coupled thereto, a second measuring device for measuring the relative angular rotation between the worktable and the flywheel mass coupled thereto, a transmission device having a transmission ratio corresponding to that between the speeds of drive of the cutter shaft and the worktable, means for comparing the outputs of the two measuring devices through such transmission device, means for generating a signal in accordance with such comparison, a regulating device associated with the drive to the cutter shaft and controlled by such signal, and means whereby the regulating device acts to cause longitudinal movement of the cutter shaft and thereby to maintain a substantially constant ratio between the angular rotations of the cutter shaft and the worktable.

6. A hobbing machine for cutting toothed wheels and the like, having a cutter shaft carrying the hob and a rotary table for carrying a workpiece and means for driving the cutter shaft and the worktable at appropriate speeds, and including means for reducing indexing errors in the operation of the machine, such means comprising two flywheel masses, spring means through which such masses are respectively coupled to the cutter shaft and to the worktable, a first measuring device for measuring the relative angular rotation between the cutter shaft and the flywheel mass coupled thereto, a second measuring device for measuring the relative angular rotation between the worktable and the flywheel mass coupled thereto, a transmission device having a transmission ratio corresponding to that between the speeds of drive of the cutter shaft and the worktable, means for comparing the outputs of the two measuring devices through such transmission device, means for generating a signal in accordance with such comparison, a regulating device associated with the drive to the worktable and controlled by such signal, a worm forming part of the drive to the worktable, and means whereby the regulating device acts to cause longitudinal movement of such worm and thereby to maintain a substantially constant ratio between the angular rotations of the cutter shaft and the worktable.

References Cited by the Examiner

UNITED STATES PATENTS

| | | | |
|---|---|---|---|
| 2,579,349 | 12/51 | Vrooman | 73—20.1 |
| 2,927,258 | 3/60 | Lippel. | |
| 2,988,964 | 6/61 | Van Acker | 90—4 |

FOREIGN PATENTS

| | | |
|---|---|---|
| 1,114,501 | 12/55 | France. |
| 1,057,850 | 5/59 | Germany. |
| 1,085,395 | 7/60 | Germany. |
| 508,744 | 7/39 | Great Britain. |
| 597,013 | 1/48 | Great Britain. |

ANDREW R. JUHASZ, *Primary Examiner.*

LEON PEAR, *Examiner.*